US008065082B2

(12) United States Patent
Suddreth et al.

(10) Patent No.: US 8,065,082 B2
(45) Date of Patent: Nov. 22, 2011

(54) DISPLAY SYSTEMS WITH ENHANCED SYMBOLOGY

(75) Inventors: John G. Suddreth, Cave Creek, AZ (US); Sergio Cecutta, Scottsdale, AZ (US); Robert E. De Mers, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 393 days.

(21) Appl. No.: 12/271,344

(22) Filed: Nov. 14, 2008

(65) Prior Publication Data

US 2010/0125412 A1    May 20, 2010

(51) Int. Cl.
*G01C 21/32* (2006.01)

(52) U.S. Cl. .......................... 701/211; 340/980

(58) Field of Classification Search .................. 701/211, 701/213, 3–8; 340/973–975, 978, 980; 342/33
See application file for complete search history.

(56) References Cited

U.S. PATENT DOCUMENTS

| | | |
|---|---|---|
| 3,961,133 A | 6/1976 | Bennett |
| 5,296,854 A | 3/1994 | Hamilton et al. |
| 5,815,411 A | 9/1998 | Ellenby et al. |
| 5,953,076 A | 9/1999 | Astle et al. |
| 5,999,165 A | 12/1999 | Matsumoto |
| 6,023,275 A | 2/2000 | Horvitz et al. |
| 6,166,744 A | 12/2000 | Jaszlics et al. |
| 6,285,317 B1 | 9/2001 | Ong |
| 6,437,759 B1 | 8/2002 | Turner et al. |
| 6,735,557 B1 | 5/2004 | Castellar et al. |
| 6,806,469 B2 | 10/2004 | Kerr |
| 6,885,939 B2 | 4/2005 | Schmidt et al. |
| 6,972,696 B2 | 12/2005 | Rogers et al. |
| 6,977,630 B1 | 12/2005 | Donath et al. |
| 7,167,779 B2 | 1/2007 | Kashiwada et al. |
| 7,286,062 B2 | 10/2007 | Feyereisen et al. |
| 7,295,901 B1 | 11/2007 | Little et al. |
| 7,301,536 B2 | 11/2007 | Ellenby et al. |
| 7,337,043 B2 | 2/2008 | Bull |
| 7,375,678 B2 | 5/2008 | Feyereisen et al. |
| 2004/0128070 A1 | 7/2004 | Schmidt et al. |
| 2006/0161348 A1* | 7/2006 | Cross et al. ................... 701/213 |
| 2006/0190172 A1* | 8/2006 | Cross et al. ................... 701/213 |
| 2007/0106433 A1 | 5/2007 | He |
| 2009/0138138 A1* | 5/2009 | Ferren et al. ..................... 701/3 |

FOREIGN PATENT DOCUMENTS

EP    1091190 A2    4/2001
EP    1959239 A1    8/2008

OTHER PUBLICATIONS

Search report issued on Apr. 6, 2010, for European Patent Application No. 09175615.

\* cited by examiner

*Primary Examiner* — Thomas Black
*Assistant Examiner* — Marthe Marc-Coleman
(74) *Attorney, Agent, or Firm* — Ingrassia Fisher & Lorenz, P.C.

(57) ABSTRACT

A see-through display system includes a processing unit configured to receive data representative of geo-referenced symbology and terrain data, to compare the geo-referenced symbology to the terrain data, and to generate display commands associated with the geo-referenced symbology based on the terrain data. The system further includes a display device coupled to the processing unit and configured to receive the display commands from the processing unit and to display the geo-referenced symbology.

20 Claims, 3 Drawing Sheets

DISPLAY SYSTEMS WITH ENHANCED SYMBOLOGY

TECHNICAL FIELD

The present invention generally relates to aircraft display systems and methods and, more particularly, to systems and methods for enhanced display of symbology on a see-through display.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as head-up displays (HUDs) and head-down displays (HDDs), are used in aircraft as Primary Flight Displays to display important flight management, navigation, and control information to flight crews.

As an example, a HUD typically projects flight information onto a combiner located within the general viewing area (e.g., the cockpit window) of the aircraft pilot. The HUD system can combine critical flight instrumentation (e.g., altitude, attitude, heading, airspeed, vertical speed instruments) and primary engine instrument indicators into a single, readily interpretable display. As a result, HUD systems have become effective visual tools for controlling aircraft, reducing pilot workload, increasing situational awareness, and improving overall flight safety.

However, the amount of flight information provided onto the combiner of a conventional HUD system is generally limited to permit simultaneous viewing of the flight information and the environment beyond the cockpit window. Since the combiner overlays the information onto a view of the actual environment, any information having a particular position on the environment may not be accurately displayed in some instances. For example, if the information is symbology representing an airport, and the airport is located behind a mountain, conventional HUD systems could render the airport without regard to the intervening terrain, thereby producing an image that appears as if the airport extends through the mountain. It is therefore desirable to improve the accuracy of the information presented to the flight crew.

Accordingly, it is desirable to provide systems and methods with enhanced display of symbology, particularly an enhanced display of geo-referenced symbology. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a see-through display system includes a processing unit configured to receive data representative of geo-referenced symbology and terrain data, to compare the geo-referenced symbology to the terrain data, and to generate display commands associated with the geo-referenced symbology based on the terrain data. The system further includes a display device coupled to the processing unit and configured to receive the display commands from the processing unit and to display the geo-referenced symbology.

In accordance with another exemplary embodiment, a see-through display system is associated with a user at a viewing perspective. The system includes a processing unit configured to receive data representative of first geo-referenced symbology and terrain data, the terrain data including data associated with a first terrain feature, the processing unit further configured to supply display commands associated with the first geo-referenced symbology. The system further includes a display device coupled to the processing unit, and configured to receive the display commands from the processing unit and to display the geo-referenced symbology such that the first geo-referenced symbology appears at least partially obscured by the first terrain feature from the viewing perspective.

In accordance with another exemplary embodiment, a method is provided for displaying geo-referenced symbology in a see-through display for a user at a viewing perspective. The method includes determining a position for geo-referenced symbology; receiving terrain data that includes a terrain feature in front of the position of the geo-referenced symbology from the viewing perspective of the user; generating display control signals associated with the geo-referenced symbology; and displaying the geo-referenced symbology based on the display control signals such that the terrain feature at least partially obscures the geo-referenced symbology.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods. More specifically, the visual display systems and methods display images that include enhanced geo-referenced symbology such as waypoints and runways. The appearance of the geo-referenced symbology is based on terrain data even though the terrain data may not be displayed itself.

Figure 1:
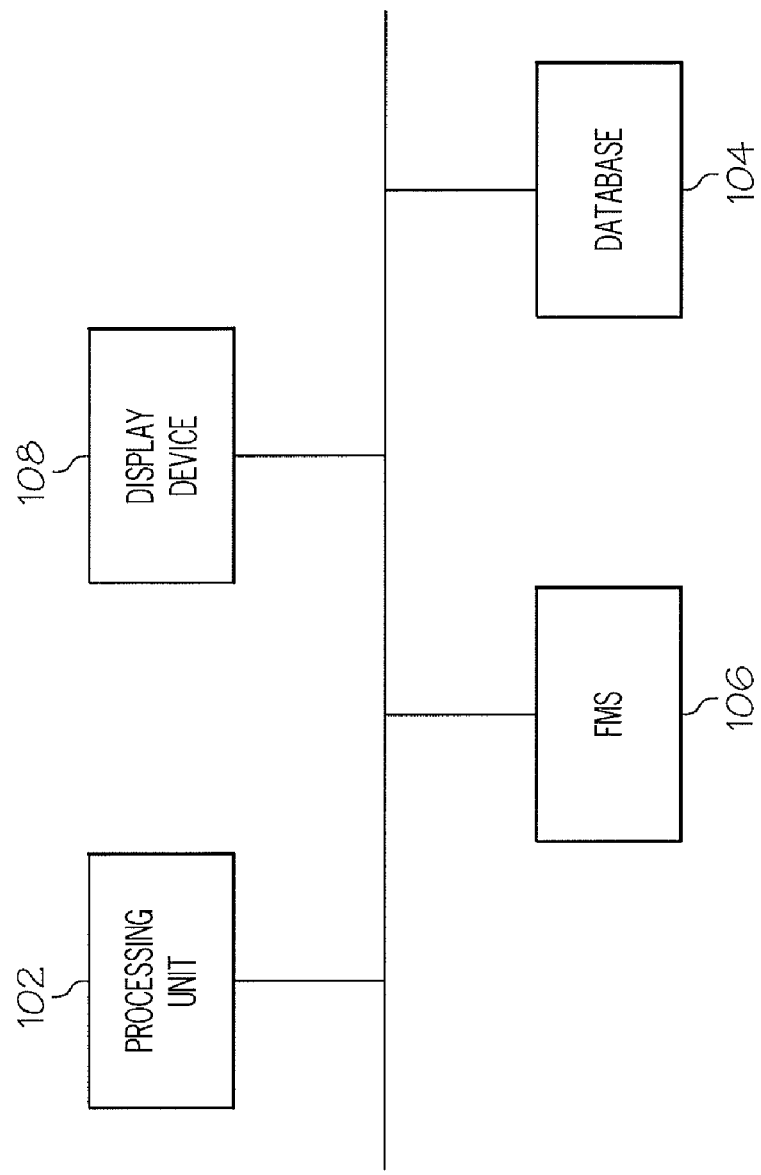
FIG. 1 is a functional block diagram of an aircraft display system according to an exemplary embodiment.

FIG. 1 depicts a block diagram of an exemplary head-up display (HUD) system 100 for displaying enhanced geo-referenced symbology. Although the system 100 described herein as a HUD system, the system 100 may also be a near-to-eye (NTE) display system or any other type of see-through display. The system 100 may be incorporated into an aircraft or other type of vehicle, or carried or worn by the user, for example, in a helmet. In the exemplary embodiment shown, the HUD system 100 includes a processing unit 102, a database 104, a flight management system 106, and a display device 108. In one embodiment, the display device 108 includes a projector, and a combiner, although any suitable display unit or combination of units may be provided. Notably, it should be understood that although the HUD system 100 appears in FIG. 1 to be arranged as an integrated system, the HUD system 100 is not so limited and can also include an arrangement whereby one or more of the processing unit 102, the database 104, the flight management system 106, a projector 112, and a combiner 116 is a separate component or a subcomponent of another system located either onboard or external to an aircraft. Also, for example, the HUD system 100 can be arranged as an integrated system or a subsystem of a more comprehensive aircraft system (e.g., flight management system, navigation and control system, target aiming and control system, collision alert and/or avoidance system, weather avoidance system, etc.). The HUD system 100 can be utilized in an aircraft, such as a helicopter, airplane, or unmanned vehicle. Moreover, exemplary embodiments of the HUD system 100 can also be utilized in spacecraft, spacesuits, ground- and air-based helmets, ships, submarines, fixed wing and rotor aircraft, such as helicopters, as well as other types of vehicles, including automobiles, military vehicles and the like. For simplicity, embodiments are described below with reference to "aircraft."

The processing unit 102 can be any type of computer processor associated with a visual display system. Generally, the processing unit 102 receives and/or retrieves flight management information (e.g., from the flight management system 106) and landing, target and/or terrain information (e.g., from database 104). The processing unit 102 generates display control signals associated with the flight management information, which may include symbology such as a zero pitch reference line, heading indicators, tapes for airspeed and altitude, terrain information, flight path information, RNP information, and any other information desired by a flight crew. The processing unit 102 then sends the generated display control signals to a display device 108. More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing, waypoint, and target location as either absolute coordinate data or as a function of an aircraft's position. Database 104 can also include, for example, a terrain data, which includes the locations and elevations of natural and manmade terrain. Generally, the term "terrain" represents any 3D object within the environment. More specifically, the terrain data in the database 104 can also include the locations and elevations of natural terrain obstacles such as mountains or other elevated ground areas, and also the locations and elevations of man-made obstacles such as radio antenna towers, buildings, bridges, etc. The terrain data in the database 104 can be up-linked from an external source or populated in real time from an onboard device that senses and maps terrain, such as, for example, a Forward Looking Infrared (FLIR) sensor, or an active or passive type of radar device.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., pitch, airspeed, altitude, attitude, etc.). Information can be provided to the processing unit 102 by, for example, an Inertial Reference System (IRS), Air-data Heading Reference System (AHRS), and/or a global positioning system (GPS). In other embodiments, the flight management system 106 can be replaced with a general positioning and/or mission management system.

The HUD system 100 also includes the display device 108 coupled to the processing unit 102. The processing unit 102 executes one or more algorithms (e.g., implemented in software) for determining the position of the various types of desired information. The processing unit 102 then generates a plurality of display control signals representing this data, and sends display control signals for display on the display device 108. The display device 108 and/or processing unit 102 may include a graphics display generator for generating the appropriate symbology, as discussed in greater detail below. The display device 108 may be a color LCD type projection unit that images a variety of symbology onto a combiner in predetermined color formats, patterns, shading, and the like, in response to instructions from the processing unit 102. As noted above, any type of display device 108 may be incorporated into the system 100, including an OLED, LCD, or scanning laser projected onto or into the edge of a combiner.

Figure 2:
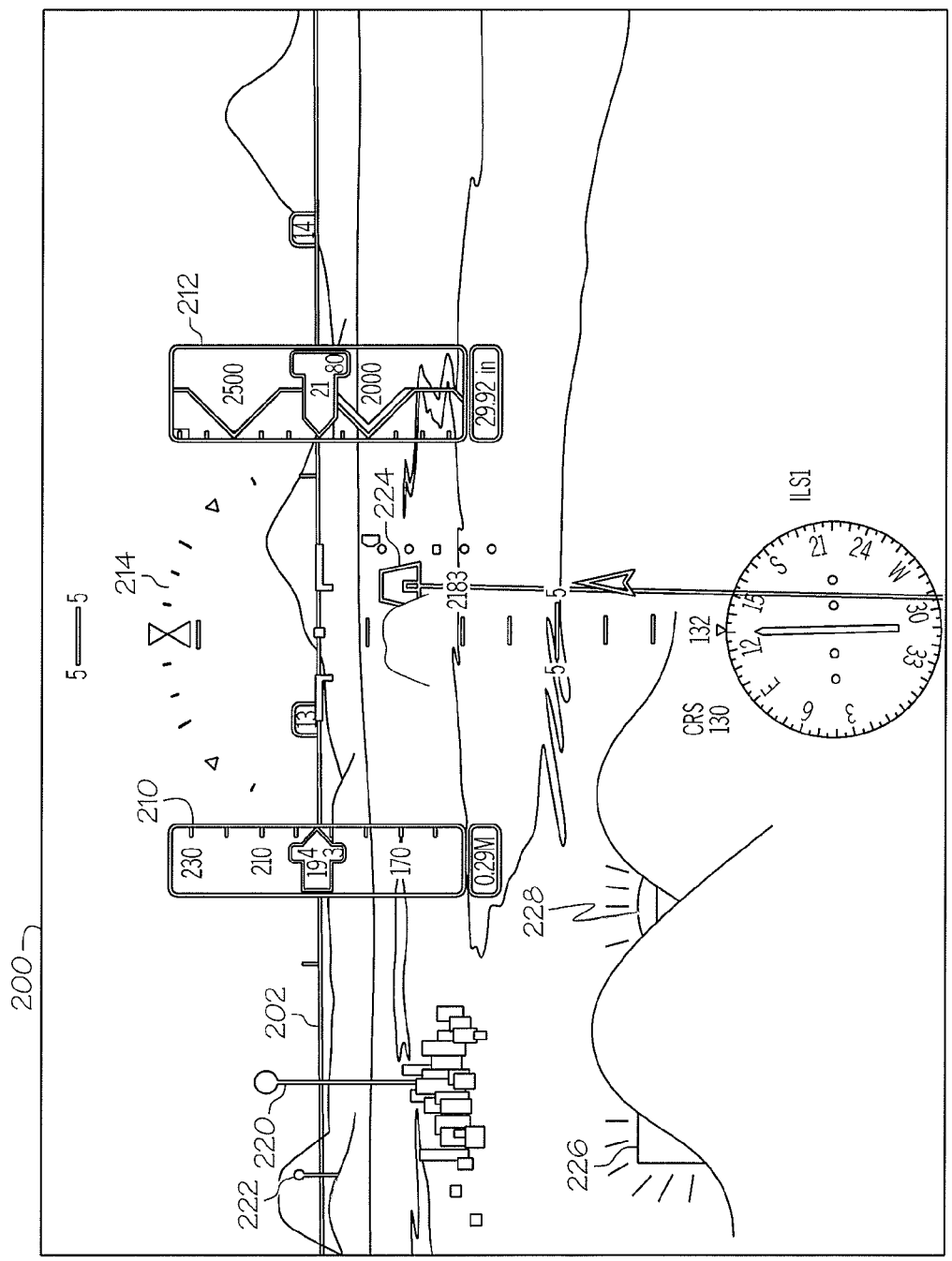
FIG. 2 depicts an exemplary image that may be rendered by the aircraft display system of FIG. 1.

FIG. 2 depicts an exemplary visual display 200 that may be rendered by the HUD system 100 of FIG. 1. As noted above, the visual display 200 is displayed over actual terrain 214 as the flight crew looks through the combiner 116 (FIG. 1). The visual display 200 may include symbology that may be useful to the flight crew. In this embodiment, the symbology of the visual display 200 includes, among other things, computer generated symbols representing a zero pitch reference line (e.g., commonly referred to as a horizon line) 202, an airspeed scale or tape 210, an altitude scale or tape 212, and a roll scale 216.

In addition, and as will now be described in more detail, the visual display 200 in FIG. 2 may also selectively render geo-referenced symbology 220, 222, 224, 226, 228. The geo-referenced symbology 220, 222, 224, 226, 228 corresponds to a particular position in the actual terrain 214. In this particular exemplary embodiment, the geo-referenced symbology includes waypoints 220, 222, airport 224, enhanced building symbology 226, and target 228. Waypoint 220 is located behind the buildings in the terrain 214 and waypoint 222 is between two mountains. At least part of airport 224 is behind a hill. Building 226 and target 228 are similarly behind terrain 214. Other examples of geo-referenced symbology can include flight path information, required navigation performance (RNP) information, conformal symbology, restricted airspace designations, landing pads, and any type of ground referenced targets.

Conventional systems merely overlay the symbology onto the actual terrain by mapping the geo-referenced symbology onto the designated position of the perspective view, without regard to the actual elevation and characteristics of the terrain. For example, in a conventional system, the waypoint 220 would appear in front of or within the buildings, waypoint 222 would appear in front or within both mountains, and airport 224 would appear to go through the hill. In accordance with an exemplary embodiment, the HUD system 100 (FIG. 1) considers the terrain such that the geo-referenced symbology 220, 222, 224, 226, 228 appears more accurately relative to the terrain 214.

Figure 3:
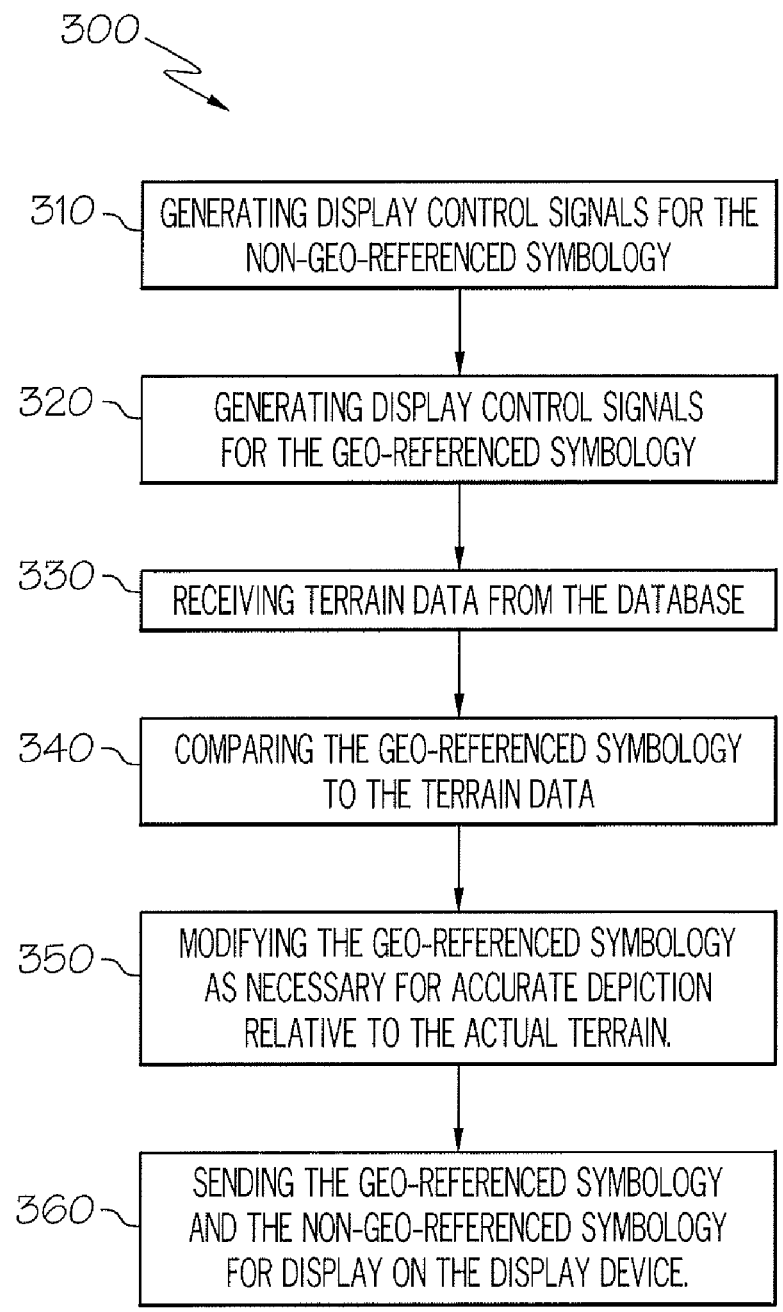
FIG. 3 is a flowchart depicting a display method according to an exemplary embodiment.

Any number of techniques can be used to ensure that the geo-referenced symbology 220, 222, 224 is properly displayed on the visual display 200. One such method is shown in FIG. 3, and additional reference is made to FIGS. 1 and 2.

In a first step 310, the processing unit 102 generates display control signals for the LCD projector 112 for the non-geo-referenced symbology, including the zero pitch reference line 202, flight path marker 206, airspeed tape 210, altitude tape 212, and roll scale 216. In a second step 320, the processing unit 102 generates display control signals for the geo-referenced symbology, including the waypoints 220, 222, airport 224, building 226, and target 228. In a third step 330, the processing unit 102 receives terrain data from the database 104, and in a fourth step 340, the processing unit 102 compares the position and characteristics of the geo-referenced symbology 220, 222, 224 to the actual terrain data from the database 104. In one exemplary embodiment, this comparison can be a pixel by pixel comparison, although any suitable comparison technique can be used. In a fifth step 350, the processing unit 102 modifies the display control signals for the geo-referenced symbology as necessary for accurate depiction relative to the actual terrain 214. In a sixth step 360, the processing unit 102 sends the geo-referenced symbology 220, 222, 224, 226, 228 and the non-geo-referenced symbology to the display device 108. This method results in an accurate visual display (e.g., display 200) for viewing geo-referenced symbology 220, 222, 224, 226, 228 relative to the actual terrain 214.

Other mechanisms for modifying the visual display 200 relative to the terrain 214 may also be used. For example, in an alternate embodiment, display signals corresponding to terrain symbology are provided to the display device 108 for display. However, the display device 108 displays the terrain symbology in a color that will not be visible to the viewer on the see-through display, such as for example, a "clear" color such as black. In this way, the terrain symbology is not visible, but since it is drawn onto the display device 108, it acts as a mask to modify the appearance of the geo-referenced symbology 220, 222, 224, 226, 228 from the perspective of the viewer such that it is accurately displayed relative to the real terrain 214. This results in the system 100, in effect, performing a per-pixel calculation and clearing the object pixels where the terrain at issue would normally be rendered. In a further embodiment, the terrain may be rendered with an off-screen 3D buffer, for example, a buffer that contains depth and height information that is used as a 3D mask when rendering objects. In a further embodiment, a ray tracing algorithm can be utilized to determine which portion of the symbology 220, 222, 224, 226, 228 should be displayed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A see-through display system, comprising:
   a processing unit configured to receive data representative of geo-referenced symbology and terrain data, to compare the geo-referenced symbology to the terrain data, and to generate display commands associated with the geo-referenced symbology based on the terrain data; and
   a display device coupled to the processing unit and configured to receive the display commands from the processing unit and to display the geo-referenced symbology, wherein the processing unit is configured to additionally supply data commands representing terrain symbology based on the terrain data, the display device configured to overlay the terrain symbology onto at least a portion of the geo-referenced symbology.

2. The system of claim 1, wherein the processing unit is configured to supply display commands that modify the geo-referenced symbology based on the terrain data.

3. The system of claim 1, wherein the processing unit is configured to perform a comparison between the terrain data and the geo-referenced symbology.

4. The system of claim 3, wherein the comparison is a pixel-by-pixel comparison.

5. The system of claim 1, wherein the terrain symbology is displayed in a non-visible color.

6. The system of claim 1, wherein the geo-referenced symbology includes at least one of a waypoint, airport, obstacle, vehicle, building, or target.

7. The system of claim 1, wherein the display device includes a HUD projector and a combiner.

8. The display system of claim 1, wherein the terrain symbology is rendered with an off-screen 3D buffer as a 3D mask.

9. A see-through display system associated with a user at a viewing perspective, comprising:
   a processing unit configured to receive data representative of first geo-referenced symbology and terrain data, the terrain data including data associated with a first terrain feature, the processing unit further configured to supply display commands associated with the first geo-referenced symbology; and
   a see-through display device coupled to the processing unit, and configured to receive the display commands from the processing unit and to display the geo-referenced symbology such that the first geo-referenced symbology appears at least partially obscured by the first terrain feature from the viewing perspective.

10. The display system of claim 9, wherein the processing unit is configured to modify the geo-referenced symbology such that the geo-referenced symbology appears obscured by the first terrain feature.

11. The display system of claim 9, wherein the display device is configured to display terrain symbology based on the terrain data such that the first terrain feature appears to at least partially obscure the first geo-referenced symbology.

12. The display system of claim 11 wherein the terrain symbology at least partially masks the first geo-referenced symbology.

13. The display system of claim 11 wherein the terrain feature is displayed in a non-visible color such that the terrain feature is visible and the first geo-referenced symbology is at least partially obscured from the viewing perspective.

14. The display system of claim 9, wherein the geo-referenced symbology includes at least one of a waypoint, airport, obstacle, vehicle, building, or target.

15. The display system of claim 9, wherein the display device includes a HUD projector and a combiner.

16. The display system of claim 9, wherein the display device includes a near-to-eye display.

17. A method of displaying geo-referenced symbology in a see-through display for a user at a viewing perspective, the method comprising the steps of:
   determining a position for geo-referenced symbology;

receiving terrain data that includes a terrain feature in front of the position of the geo-referenced symbology from the viewing perspective of the user;

generating display control signals associated with the geo-referenced symbology; and displaying the geo-referenced symbology based on the display control signals such that the terrain feature at least partially obscures the geo-referenced symbology.

18. The method of claim 17, further comprising the step of modifying the display control signals for the geo-referenced symbology based on the terrain feature.

19. The method of claim 17, further comprising the step of generating display control signals associated with terrain symbology based on the terrain feature; and displaying the terrain symbology.

20. The method of claim 19, wherein the displaying step includes masking at least a portion of the geo-referenced symbology with the terrain symbology.

* * * * *